United States Patent [19]

Noji et al.

[11] Patent Number: 4,504,738

[45] Date of Patent: Mar. 12, 1985

[54] INPUT SCREEN FOR AN IMAGE INTENSIFIER TUBE AND A METHOD OF MAKING THE SAME

[75] Inventors: Takashi Noji, Odawara; Yoshiharu Obata, Yokohama; Takayoshi Higashi, Chigasaki, all of Japan

[73] Assignee: Tokyo Shibaura Denki Kabushiki Kaisha, Japan

[21] Appl. No.: 446,618

[22] Filed: Dec. 3, 1982

[30] Foreign Application Priority Data

Dec. 26, 1981 [JP] Japan ............................... 56-213004

[51] Int. Cl.$^{3}$ ............................................. G01T 1/16

[52] U.S. Cl. .................................. 250/483.1; 427/65; 427/70

[58] Field of Search ............... 250/488.1, 486.1, 483.1; 427/65, 70

[56] References Cited

U.S. PATENT DOCUMENTS 3,825,736 7/1974 Osborne .
4,195,230 3/1980 Ataka et al. ...................... 250/483.1

FOREIGN PATENT DOCUMENTS 0042149 12/1981 European Pat. Off. .
2229135 12/1974 France .
7714411 12/1977 France .
0165553 12/1980 Japan .................................... 427/65

OTHER PUBLICATIONS

Stevels et al., "Vapour Deposited CsI:Na Layers II . . . ," *Philips Research Repts*, vol. 29, 1974, pp. 353-362.
Bates, "Scintillation Processes . . . ," *Adv in Electronics and Electron Physics* 28A, 1969, pp. 451-459.

*Primary Examiner*—Alfred E. Smith
*Assistant Examiner*—Jack I. Berman
*Attorney, Agent, or Firm*—Cushman, Darby & Cushman

[57] ABSTRACT

An input screen and method of forming one for an image intensifier tube including a substrate in which a plurality of crystal grains of aluminum or aluminum alloy are formed in a plane with the crystal grains having non-directional shapes in the plane. The crystal grains are formed by heating in a vacuum or non-oxidizing atmosphere at a temperature between 450° C. and 650° C. The oxidized layer is next removed by an etchant, and a phosphor layer formed on the crystal grains by vapor-deposit.

12 Claims, 4 Drawing Figures

INPUT SCREEN FOR AN IMAGE INTENSIFIER TUBE AND A METHOD OF MAKING THE SAME

BACKGROUND OF THE INVENTION

The present invention relates to an input screen for an image intensifier tube and a method of making the same.

Generally, an input screen for an image intensifier tube, such as an X-ray, a $\gamma$-ray or other radiation ray image intensifier tube, is required to have a high resolution. Particularly a medical use image intensifier tube for taking a photograph of an organ of a human body is required to have such a characteristic. To improve the resolution, it is well known to have an input phosphor layer cracked in the direction of thickness to provide a kind of light guide. Such an input phosphor layer can be formed by vapor-depositing cesium iodide on a substrate having an uneven surface as described in, for example, U.S. Pat. No. 4,184,077. According to this patent, a surface of aluminum substrate is provided with fine grooves by anodizing, sealing and heat treatment. Phosphor blocks are then formed by depositing phosphor material on the surface of the aluminum substrate. Cracks in the phosphor layer are formed corresponding to the fine grooves. However, the islands separated by the cracks of the substrate have relatively large diameters of 50 $\mu$m to 100 $\mu$m and the phosphor blocks have similar diameters. These values are too large so that further improvement of resolution is required.

Recently an improved input screen has been developed and is described in U.S. application No. 272,764 filed on June 11, 1981 and issued as U.S. Pat. No. 4,437,011. This input screen has a first phosphor layer including phosphor crystal particles with a mean diameter of 15 $\mu$m or less on a smooth surface of the substrate and a second phosphor layer formed on the first phosphor layer. The second phosphor layer includes individual columnar crystals grown on the phosphor crystal particles. This input screen improves resolution remarkably. However, the phosphor layer is formed on the even surface of the substrate and adhesion of the phosphor layer is weak. Therefore, strict control of the manufacturing process is needed to ensure adequate adhesion. As well known, when the phosphor material is vapor-deposited on the substrate at low temperature, the size of the columnar crystals is small and the resolution is improved, but adhesion becomes weak. On the contrary, when the substrate is high in temperature, the crystal spreads laterally on the substrate and adhesion increases. However, the resolution tends to decrease because of relatively large columnar crystals. Thus, strict control of the manufacturing process is required to obtain an input screen having both good adhesion and high resolution. This is difficult in mass production.

The present inventors investigated in detail the adhesion of a cesium iodide phosphor layer vapor-deposited on a smooth surface of an aluminum substrate. The phenomenon of peeling off of the phosphor layer was found to be a partial peeling off as plural cracks appear in one particular direction or the phosphor layer rose. The peeling off was particularly seen at the portion near the center of the substrate. Peeling off also occurs during the gradual cooling of the substrate after the vapor deposition of cesium iodide phosphor material. Thus, peeling off seems to be caused by the thermal expansion coefficient differential between aluminum and cesium iodide. The thermal expansion coefficient of aluminum is about $2.4\times10^{-5}$/°C. at room temperature to 200° C., and that of cesium iodide is about $5.3\times10^{-5}$/°C. in the same range of temperature. Peeling off was particularly observed when an oxidized layer, such as $Al_2O_3$, was formed on the surface of the substrate. The peeling off occured over a relatively large area even though it occured partially. Unevenness or scratches caused by the rolling and the structure of the substrate also encourage peeling of the phosphor layer. That is, when cesium iodide is deposited on the uneven or line-like scratched surface of the substrate, the phosphor layer is prone to peel off or to crack at uneven or scratched surface portions during cooling. If the substrate is made of a rolled sheet, the crystalline structure of the substrate has long crystal grains aligned along the rolling direction. Thermal expansion and thermal shrinking are larger in the direction along the longitudinal direction of the crystal grain than in the direction perpendicular to the longitudinal direction. During cooling after vapor-depositing, the aluminum substrate shrinks more in the longitudinal direction of the crystal grain than in other directions, so that the phosphor layer tends to crack or peel. It is practically impossible to avoid scratches or the unevenness caused by the rolling. It is also inevitable for the crystal grains to align along the rolling direction.

SUMMARY OF THE INVENTION

A primary object of the present invention is to provide an input screen having an input phosphor layer in which adhesion is improved.

Another object of the present invention is to provide an input screen presenting a high resolution.

Therefore, the present invention provides an input screen for an image intensifier tube having a substrate consisting of a plurality of crystal grains of aluminum or aluminum alloy in a plane with the crystal grains having nondirectional shapes in the plane, and a phosphor layer deposited on the crystal grains.

The present invention also provides a method of making an input screen in which a substrate made of aluminum or aluminum alloy is heated at a temperature of 450° to 650°, and the oxidized layer is then removed from the surface of the substrate and a phosphor layer is formed on the substrate.

BRIEF DESCRIPTION OF THE DRAWINGS

The invention will be described in detail with reference to the accompanying drawings, wherein.

DETAILED DESCRIPTION OF THE PREFERRED EMBODIMENT

Figure 1:
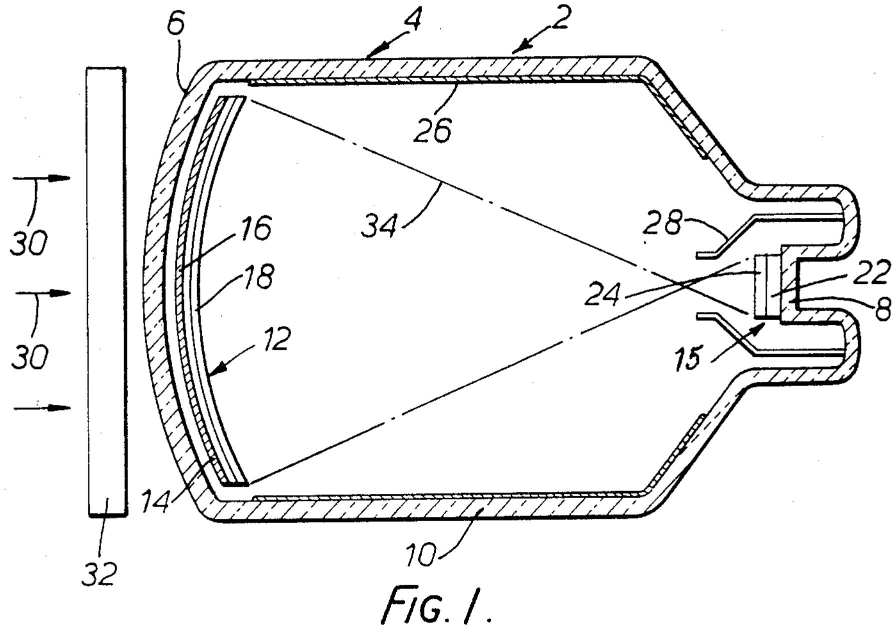
FIG. 1 is a cross-section of an image intensifier tube provided with an input screen of the present invention.

Referring now to FIG. 1, image intensifier tube 2 includes an input screen according to the present invention. Intensifier tube 2 has an envelope 4 of glass with an entrance window 6, an observation window 8 and a body portion 10 therebetween. An input screen 12 is provided near the entrance window and an output screen is provided on the observation window. The input screen includes a substrate 14, an input phosphor layer 16 and a photoemissive layer 18. The output screen has a glass substrate 22 and an output phosphor layer 24. A focusing electrode 26 is attached to the inner wall of body portion 10, and an accelerating electrode 28 is arranged to surround output screen 14.

The image intensifier tube of this invention operates in the following manner. High energy radiation rays 30, for example X-rays, are directed onto the subject to be examined and are modulated by the absorption of the subject. The modulated radiation rays penetrate the entrance window and impinge upon the input screen. The radiation rays penetrate substrate 14 and cause input phosphor layer 16 to emit light, thus converting the modulated radiation rays into a light image. The emitted light is converted into photoelectrons 34 by photoemissive layer 18. Photoelectrons 34 are focused by focusing electrode 26 while being accelerated by accelerating electrode 28. The energy of photoelectrons is then reconverted to visible light by output phosphor layer 24 to form a visible image. The visible image obtained at output screen 15 is several times brighter than that obtained by input phosphor layer 16.

The substrate is made from an aluminum sheet and its thickness is 0.3 mm to 1.5 mm. More than 99.5% high purity raw sheet, which does not contain any impurities having a larger atomic weight than aluminum, is preferable. However, when large mechanical strength is required, an aluminum alloy can be used. Generally, such aluminum sheet is made by cold rolling. It has a surface with high reflectivity, but the surface has inevitable rolling scratches along the rolling direction. The roughness of the surface is preferably within 3 μm (average). The surface has also an oxidized layer, such as $Al_2O_3$. The aluminum sheet is made into a specially shaped substrate. The substrate is heat-treated in vacuum, for example, approximately $1\times10^{-6}$ Torr. The temperature of the heat treatment is higher than the temperature at which crystals of aluminum recrystallize and the crystal grain becomes large, and is lower than the melting point of aluminum. Accordingly, the temperature is between 450° C. and 650° C., and is preferably 500° C. to 600° C. in case of a high purity aluminum substrate described above. Higher temperature shortens the treatment time and lower temperature lengthens it. The heat treatment is carried out, for example, at a temperature of 550° C. for 30 minutes. As a result, the crystal grain has a mean diameter of several hundred μm to about ten mm in a plane of the surface of the substrate. The mean diameter is defined by (maximum diameter+minimum diameter)/2. The heat treatment can be also conducted in non-oxidizing gas atmosphere, such as nitrogen, hydrogen, argon or a mixture thereof.

The substrate is next etched with an etchant, for example phosphoric acid or caustic soda, to remove the oxidized layer on the surface of the substrate. When caustic soda is used as an etchant for aluminum or aluminum oxide, the decrease of the thickness is approximately proportional to the etching time. The change of the thickness is caused by removing the oxidized layer. The etching is preferably carried out until the thickness decreases more than 3% with respect to the initial thickness. It can be practically done by dipping the substrate in 5% caustic soda for about 20 minutes. After etching, the surface is cleaned and dried, and the crystal grains can be observed clearly. The substrate is then held in an atmosphere without oxygen to prevent the surface from being re-oxidized.

Figure 2:
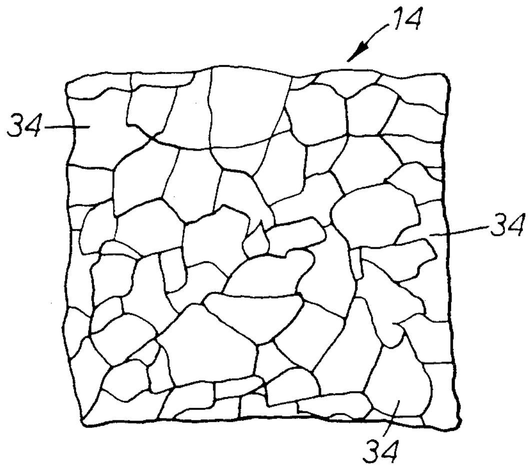
FIG. 2 is a top view of a substrate.

Referring now to FIG. 2, a top view of the substrate after the above described treatment is shown. The crystal grains 34 are exposed on the surface of substrate 14. They have mean diameters of between several hundred μm to between about ten mm and sixteen mm. The largest crystal grain occasionally has a mean diameter of 20 mm. The shapes of crystal grains 34 are nondirectional i.e. not aligned along any direction and they have no relation to the rolling scratches or unevenness of the surface. Further, crystal grains 34 can be seen on both the surfaces of the substrate and their shapes are nearly equal.

Figure 3:
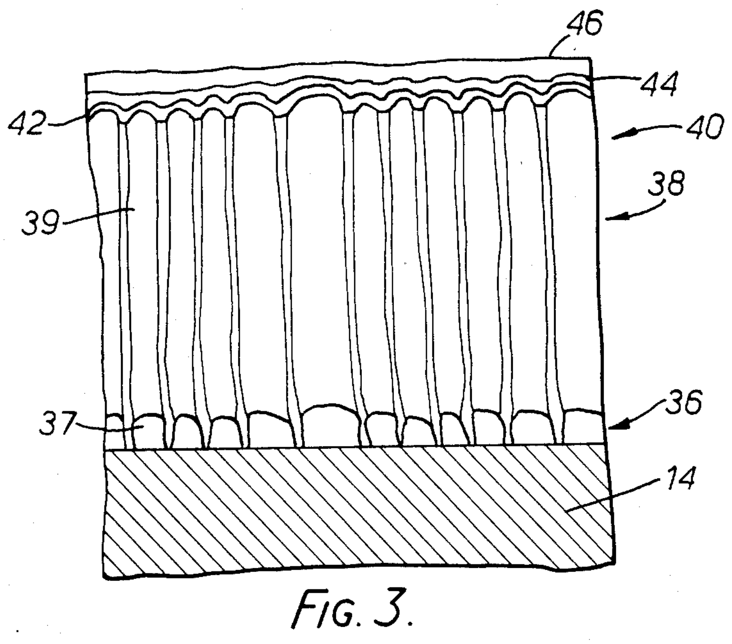
FIG. 3 is an enlarged cross section of the input screen according to the present invention.

The input phosphor screen is then formed on the substrate. Referring now to FIG. 3, an enlarged cross-section of the input screen is illustrated. Substrate 14 is set in a vapor depositing apparatus, and is then exhausted and cleaned by being heated in vacuum at a temperature of about 300° C. The temperature of the substrate is lowered to 80° C. to 150° C., preferably 80° C. to 100° C. An alkali halide phosphor material such as cesium iodide is vapor-deposited on the surface in low pressure vacuum, for example $1\times10^{-3}$ to $1\times10^{-2}$ Torr, containing a non-active gas such as argon, and a first phosphor layer 36 is formed. First phosphor layer 36, has crystal particles 37 having mean diameters of 15 μm or less. Then, at a high vacuum of $1\times10^{-4}$ to $1\times10^{-2}$ Torr, cesium iodide is vapor-deposited on the first phosphor layer and a second phosphor layer 38 is formed. Second phosphor layer 38 has individual columnar crystals 39 grown substantially vertically with respect to the surface of the substrate. Input phosphor layer 40 is formed to about 200 μm thickness. To smooth the surface of the input phosphor layer, a third phosphor layer 42 can be formed on the second phosphor layer. Then an $Al_2O_3$ layer of 5000 Å thickness is deposited on input phosphor layer 40 as a barrier layer 44. At the final stage of the manufacturing process, the input screen prepared by the above described manner is set in the tube envelope, and the tube is exhausted. The photoemissive layer 46 of compounds of K, Na, Cs and Sb is then formed on barrier layer 44.

Figure 4:
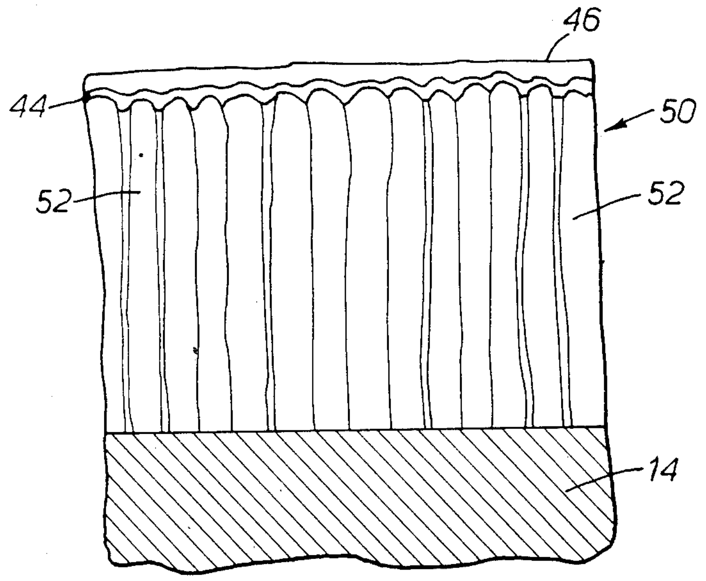
FIG. 4 is an enlarged cross-section of another input screen according to the present invention.

According to the present invention, the input phosphor screen can be formed by vapor-depositing in only vacuum even though the above described vapor-depositings are carried in both low pressure and high vacuum. FIG. 4 shows the enlarged cross-section of the input screen formed by this method. In this method, cesium iodide is vapor-deposited in high vacuum, for example $5\times10^{-6}$ Torr, while the temperature of the substrate is held to about 100° C., this vapor-deposition forming an input phosphor layer 50 having individual columnar crystals 52 grown on substrate 14.

According to the present invention described above, the input phosphor layer has columnar crystals of mean diameters 5 μm to 15 μm, which act like light guides. Adhesion between the input phosphor layer and the substrate is strong and further the input phosphor layer is difficult to peel off or crack. The reason is as follows. Generally, when the metal is heated, the atoms are rearranged and recrystallization begins. That is, when the substrate of aluminum or aluminum alloy is annealed by heat treatment, recrystallization begins at a temperature of 150° C. to 240° C. This temperature is the so called recrystallization temperature and varies depending on the amount of the impurity and the degree of the rolling. Recrystallization is caused by the energy of lattice strain of dislocation which results from cold rolling. Generally, near the recrystallization temperature the diameter of each crystal grain is small. However, the crystal grain size becomes large by lengthy heating and heating at a higher temperature than the recrystallization temperature, i.e. so called grain growth occurs. As a result of annealing above the temperature of about 450° C., a recrystallized and grown crystal grain has a mean diameter between several hundred μm and between about ten mm and sixteen mm as described above. The crystalline structure of the substrate remains almost unchanged in the image intensifier tube as finally manufactured. The substrate comprises the non-directional and relative large crystal grains described above. Over the whole substrate, non-uniformity in thermal expansion and thermal shrinkage with respect to any one direction is thereby eliminated. Therefore, the input phosphor layer formed on the substrate is difficult to peel off even though the input phosphor layer is vapor-deposited on the substrate at a temperature lower than 100° C.

Further, as a result of the heat treatment, almost all crystal grains have the desired crystal faces (2,0,0). If the heating step and the cooling step are offset from the predetermined values, another crystal face peak is found by x-ray diffraction. Aluminum has a face-centered cubic structure, and a lattice constant of (2,0,0) 1.43 Å. The deposited cesium iodide has the same crystal face (2,0,0) as the substrate. This also contributes to improvement in adhesion.

According to the present invention, columnar crystals of cesium iodide have a mean diameter of less than 15 μm over the entirety of the input phosphor layer in the thickness direction. The columnar crystals act as light guides so that the resolution is remarkably improved. Particularly, as the adhesion is increased, the substrate can be set at a lower temperature compared to the conventional input screen during vapor-depositing of phosphor material. This ensures that the input phosphor layer will have fine columnar crystals and improved resolution.

According to the present invention, an input screen for an image intensifier tube, which is free from peeling of the phosphor layer and shows a high resolution, is obtained. Further, because of the improvement of adhesion, strict control of manufacturing becomes unnecessary and manufacture of an input screen with high resolution is easier.

While the invention has been described in connection with what is presently considered to be the most practical and preferred embodiments, it is to be understood that the invention is not to be limited to the disclosed embodiments but on the contrary, is intended to cover various modifications and equivalent arrangements included within the spirit and scope of the appended claims which scope is to be accorded the broadest interpretation so as to encompass all such modifications and equivalent structures.

What is claimed is:

1. An input screen for an image intensifier tube comprising:

a substrate consisting of a plurality of crystal grains of aluminum or aluminum alloy arranged in a plane so that said crystal grains have non-directional shapes in said plane; and a phosphor layer vapor deposited on said crystal grains of said substrate.

2. An input screen for an image intensifier tube according to claim 1, wherein said crystal grain has a mean diameter of several hundred μm to between about ten mm and about sixteen mm in said plane.

3. An input screen for an image intensifier tube according to claim 1, wherein said phosphor layer includes columnar crystals grown substantially vertically with respect to said plane.

4. An input screen for an image intensifier tube according to claim 3, wherein said phosphor layer is made of an alkali halide phosphor material.

5. An input screen for an image intensifier tube according to claim 4, wherein said phosphor layer is made of cesium iodide.

6. An input screen for an image intensifier tube according to claim 1, wherein said phosphor layer comprises a first and a second phosphor layer, said first phosphor layer including phosphor crystal particles vapor-deposited on said substrate, and said second phosphor layer including columnar crystals grown said phosphor crystal particles.

7. A method of making an input screen for an image intensifier tube comprising the steps:

heating a substrate made of aluminum or aluminum alloy in a vacuum or non-oxidizing atmosphere at a temperature of 450° C. to 650° C.;

removing an oxidized layer on a surface of said substrate; and vapor-depositing an alkali halide phosphor material on said surface of said substrate.

8. A method of making an input screen for an image intensifier tube according to claim 7, wherein said vapor-depositing step comprise a step of vapor depositing an alkali halide phosphor material on said surface of said substrate at a low pressure in an non-activated atmosphere.

9. A method of making an input screen for an image intensifier tube according to claim 7, wherein said vapor-depositing step comprises a step of vapor depositing an alkali halide phosphor material on said surface of said substrate in a vacuum.

10. A method of making an input screen for an image intensifier tube according to claim 7, wherein said vapor-depositing step comprises a step of first vapor depositing an alkali halide phosphor material on said surface of said substrate at a low pressure in an non-activated atmosphere and a step of vapor depositing an alkali halide material on the phosphor layer formed by said first vapor depositing step in a vacuum.

11. A method of making an input screen for an image intensifier tube according to claim 7, wherein said removing step comprises a step of etching said surface of said substrate with an etchant for aluminum or aluminum oxide to expose the crystal grains of said substrate.

12. A method of making an input screen for an image intensifier tube according to claim 7, wherein said vapor-depositing step comprises a step of vapor-depositing an alkali halide phosphor material on said surface of said substrate while the temperature of substrate is being kept at 80° C. to 150° C.

* * * * *